United States Patent
Adams et al.

(10) Patent No.: US 10,633,100 B2
(45) Date of Patent: Apr. 28, 2020

(54) EJECTION SEAT

(71) Applicant: MARTIN-BAKER AIRCRAFT CO. LTD., London (GB)

(72) Inventors: Paul Adams, London (GB); Craig Hudson, London (GB); James Lorbiecki, London (GB); Phil Rowles, London (GB); Michael Constantine, London (GB); Steve Ruff, London (GB); James Boyd-Moss, London (GB)

(73) Assignee: MARTIN-BAKER AIRCRAFT CO. LTD., London (GB)

( * ) Notice: Subject to any disclaimer, the term of this patent is extended or adjusted under 35 U.S.C. 154(b) by 330 days.

(21) Appl. No.: 15/609,406

(22) Filed: May 31, 2017

(65) Prior Publication Data
US 2017/0349292 A1 Dec. 7, 2017

(30) Foreign Application Priority Data

Jun. 1, 2016 (GB) .................................. 1609596
Feb. 7, 2017 (GB) ................................ 1701995.1

(51) Int. Cl.
*B64D 25/10* (2006.01)
(52) U.S. Cl.
CPC .................................. *B64D 25/10* (2013.01)
(58) Field of Classification Search
CPC ......... B64C 25/02; B64C 25/08; B64C 25/10; B64C 25/12; B60R 2021/0093
See application file for complete search history.

(56) References Cited

U.S. PATENT DOCUMENTS

| 3,083,938 A | * | 4/1963 | Brinkworth | B64D 25/10 |
| | | | | 244/122 AH |
| 3,214,117 A | * | 10/1965 | James | B64D 25/02 |
| | | | | 244/122 A |
| 4,081,156 A | | 3/1978 | Ideskar | |
| 4,215,835 A | | 8/1980 | Wedgwood | |
| 4,359,200 A | | 11/1982 | Brevard et al. | |
| 4,592,523 A | | 6/1986 | Herndon | |
| 4,667,902 A | | 5/1987 | Zenobi | |
| 4,676,462 A | | 6/1987 | Martin | |

(Continued)

FOREIGN PATENT DOCUMENTS

| GB | 1567385 | 5/1980 |
| GB | 2538010 | 11/2016 |
| WO | 2012013985 A1 | 2/2012 |

OTHER PUBLICATIONS

UKIPO (UK Intellectual Property Office), Search Report, dated Nov. 15, 2017, pp. 1-3.

*Primary Examiner* — Christopher D Hutchens
(74) *Attorney, Agent, or Firm* — Gottlieb, Rackman & Reisman PC

(57) ABSTRACT

An ejection seat is disclosed comprising a seat back; a headrest assembly mounted to or forming part of the seat back; a pair of head support beams stowable in the headrest assembly, configured to be deployed such that they project forwardly from the headrest assembly, for capturing a seat occupant's head therebetween, and a pair of arm retention curtains, wherein at least part of each arm retention curtain is stowed in a rolled condition, configured such that deploying the head support beams and/or drawing the tethers forward from the seat back unfurls the arm retention curtains.

19 Claims, 4 Drawing Sheets

(56) References Cited

U.S. PATENT DOCUMENTS

| | | | |
|---|---|---|---|
| 5,301,903 A | 4/1994 | Aronne | |
| 5,415,366 A | 5/1995 | Mastrolia | |
| 6,315,245 B1 * | 11/2001 | Ruff | B64D 25/02 244/122 AG |
| 6,422,512 B1 * | 7/2002 | Lewis | B64D 25/02 244/121 |
| 2013/0187003 A1 * | 7/2013 | Ruff | B64D 25/02 244/122 AG |

* cited by examiner

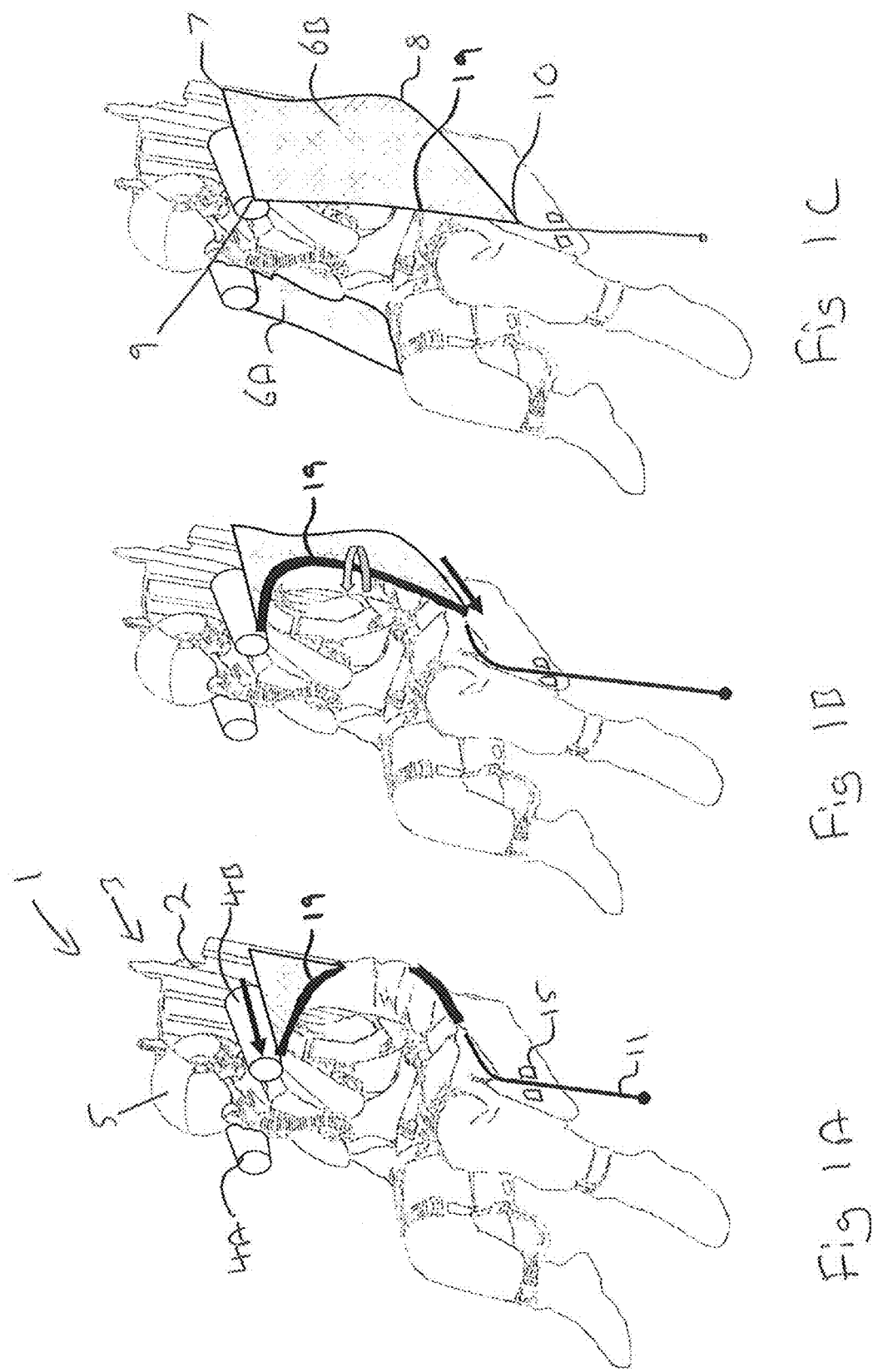

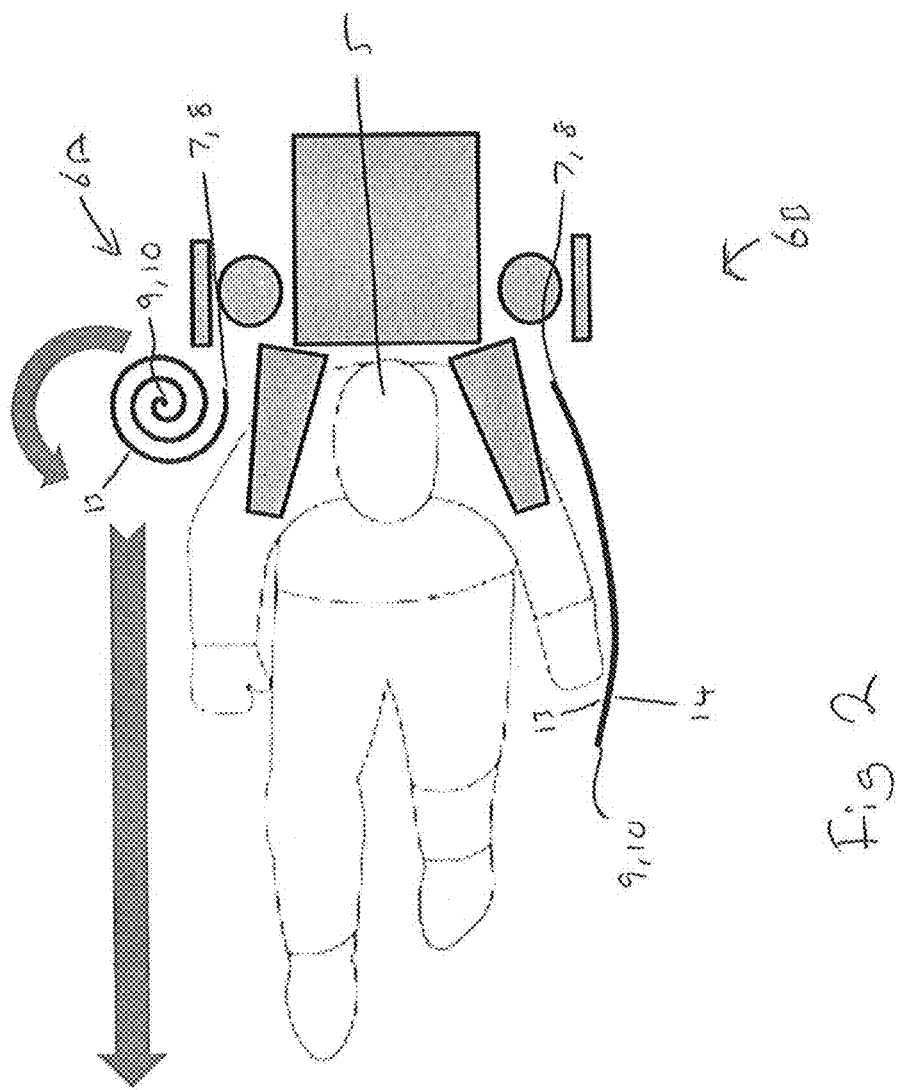

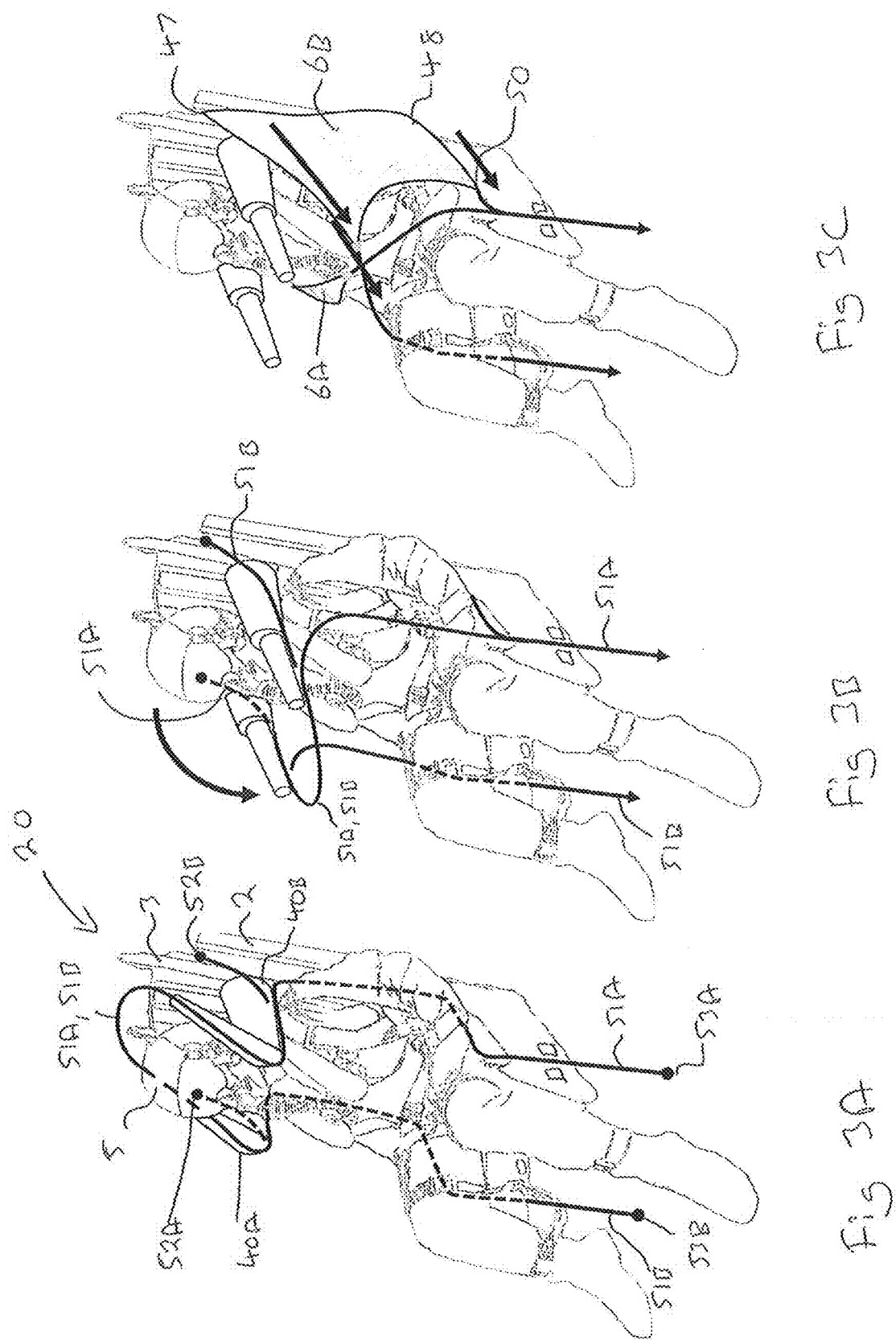

EJECTION SEAT

This application claims priority to United Kingdom Patent Application No. GB1609566.0, filed Jun. 1, 2016 and now pending, and United Kingdom Patent Application No. GB 701995.1, filed Feb. 7, 2017 and now pending, both of which are incorporated by reference in their entireties.

BACKGROUND OF THE INVENTION

The present invention relates to an ejection seat.

As an ejection seat initiates an eject procedure, a rocket motor or other propulsion system causes the seat to be propelled upwardly out of the cockpit. A parachute subsequently deploys and the ejection seat and its occupant return to the ground. As the ejection seat exits the cockpit, it enters into the wind blast passing over the cockpit, which imparts a wind force on the pilot's body. As a result, the user's head and/or limbs can flail around in the windblast, risking injury to the pilot and/or affecting the motion of the seat as it leaves the cockpit.

Moreover, at the point of ejection—generally occurring at a point of emergency—the occupant might not be seated in the ejection seat in the optimal position. For example, the occupant might be leaning forwards in the seat, the occupant's head might be angled with respect to the centre of the seat, and/or the occupant's arms might be outside of the space envelope of the seat. In some situations, the occupant may be unconscious or otherwise incapacitated to some extent. Undesirable positioning of the occupant's body or head is referred to as being "out of position".

It will be appreciated that if an ejection sequence is initiated when the seat occupant is out of position, the forces imparted by the wind blast may exacerbate the misalignment of the occupant with the seat, risking injury. In cases where the occupant's head is near the edge of the headrest, the windblast force could cause the occupant's head to move behind the plane of the headrest, risking serious injury.

Moreover, as the seat leaves the cockpit, there is a risk that an out-of-position occupant could strike the side of the cockpit or equipment in the cockpit, causing injury or, at the very least, adversely affecting the ejection path from the cockpit.

The applicant has previously proposed a headrest assembly, published as WO2012/013985, the contents of which are incorporated herein in their entirety.

There is a need to ensure that an occupant of an ejection seat is maintained in or near an optimal position throughout the ejection procedure, and/or to minimise the risk of a occupant's limbs from flailing around during ejection.

BRIEF SUMMARY OF THE INVENTION

Accordingly, the present invention provides an ejection seat comprising:
a seat back;
a headrest assembly mounted to or forming part of the seat back;
a pair of head support beams stowable in the headrest assembly, configured to be deployed such that they project forwardly from the headrest assembly, for capturing a seat occupant's head therebetween, and
a pair of arm retention curtains, each having first, second, third and fourth corners, wherein:
the first corner is secured adjacent the top of the seat back, the second corner is secured adjacent the bottom of the seat back,
the third corner is secured adjacent the distal end of a respective head support beam,
a fourth corner is secured to a respective tether which is operable to draw the fourth corner forwards from the seat back,
wherein at least part of each arm retention curtain is stowed in a furled condition, configured such that deploying the head support beams and/or drawing the tethers forward from the seat back unfurls the arm retention curtains.

Preferably, each retention curtain comprises first and second opposing surfaces, the first surface configured to face the occupant when the curtain is deployed and wherein, when stowed, the curtain is rolled along the second surface such that the first surface faces outwardly from the rolled curtain.

Preferably, the third corner is journaled to the distal end of the head support beam.

Preferably, the fourth corner is journaled to the tether.

Preferably, the tether is rolled up with a respective curtain such that drawing the tether away from the seat back causes the arm retention curtain to unfurl.

Preferably, the ejection seat further comprises a storage compartment in which the furled/rolled curtain may be stowed.

Preferably, at least a part of the edge between said third and fourth corners of an arm retention curtain includes or comprises at least one sleeve.

Preferably, said tether is secured adjacent the distal end of a respective head support beam and is translatably received through said sleeve.

Preferably, at least a part of the edge between the third and fourth corners of an retention curtain includes at least one roller.

Preferably, the sleeve comprises a plurality of rollers and a plurality of spacers, wherein a spacer is arranged between adjacent rollers and each spacer is secured to the edge between said third and fourth corners of said arm retention curtain, allowing substantially free rotation of the rollers about their longitudinal axes.

The present invention further provides an ejection seat comprising
a seat back,
a headrest assembly mounted to or forming part of the seat back;
first and second head support beams, both stowable in the headrest assembly, configured to be deployed through a capturing phase in which they project upwardly from the headrest assembly, into a retention phase in which they project forwardly from the headrest assembly, for capturing a seat occupant's head therebetween,
first and second arm retention curtains,
wherein the first head support beam and the first arm retention curtain are provided on a first side of the seat back, and the second head support beam and the second arm retention curtain are provided on a second side of the seat back, wherein the occupant is seated, in use, between the first and second sides of the seat back,
a first tether secured at a first end to the first retention curtain and removably secured, in turn, to the distal ends of the first and second head support beams respectively, the second end of the first tether arranged to be drawn downwardly from the second side of the seat.
a second tether secured at a first end to the second retention curtain and removably secured, in turn, to the distal ends of the second and first head support beams respectively, the second end of the second tether arranged to be drawn downwardly from the first side of the seat, wherein the first and second tethers are bridged between the distal ends of the first and second head support beams and cross over one another, wherein, in use, after deployment of the head support beams, the second ends of each of the first and second tethers are configured to be drawn downwards such that the first and second tethers become detached from the first and second head support beams, and further drawing of the tethers causes the first and second curtains to wrap at least partially around the occupant.

Preferably, the first and second tethers are removably secured to the distal ends of the first and second head support beams to create a loop which passes over the occupant's head during the capturing phase Preferably, each retention curtain comprises a first, second and a third corner, wherein:
the first corner is secured adjacent the top of the seat back,
the second corner is secured adjacent the bottom of the seat back,
the third corner is secured to a first end, of the respective tether Preferably, each retention curtain further comprise a fourth corner, wherein a fourth corner of the first retention curtain is secured at a point of the second tether between the first and second ends, and the fourth corner of the second retention curtain is secured at a point of the first tether between the first and second ends.

Preferably, each tether passes through a snubber to constrain movement of the tether through the snubber in one direction Preferably, in use, the distal end of each tether is secured to the cockpit of an associated aircraft with a weakened joint, configured to disconnect at a predetermined force.

Preferably, the arm retention curtain is flexible.

Preferably, the curtain is comprised, at least in part, of mesh.

Preferably, the head support beams are inflatable.

Preferably, the ejection seat further comprises a gas source to inflate said head support beams.

Preferably, the ejection seat is configured such that, in use, the arm restraint curtains extend from in the vicinity of the occupant's waist to the vicinity of the occupant's neck, thereby capturing the occupant's arms between the respective curtains.

BRIEF DESCRIPTION OF THE SEVERAL VIEWS OF THE DRAWINGS

Embodiments of the present invention will now be described, by way of non-limiting example only, in which:

FIGS. 1A-1C illustrate an ejection seat according to a first embodiment of the present invention;

FIG. 2 schematically illustrates the unfurling of the arm restraint curtain;

FIGS. 3A-3C illustrate an ejection seat according to a second embodiment of the present invention.

DETAILED DESCRIPTION OF THE INVENTION

Figure 4B:
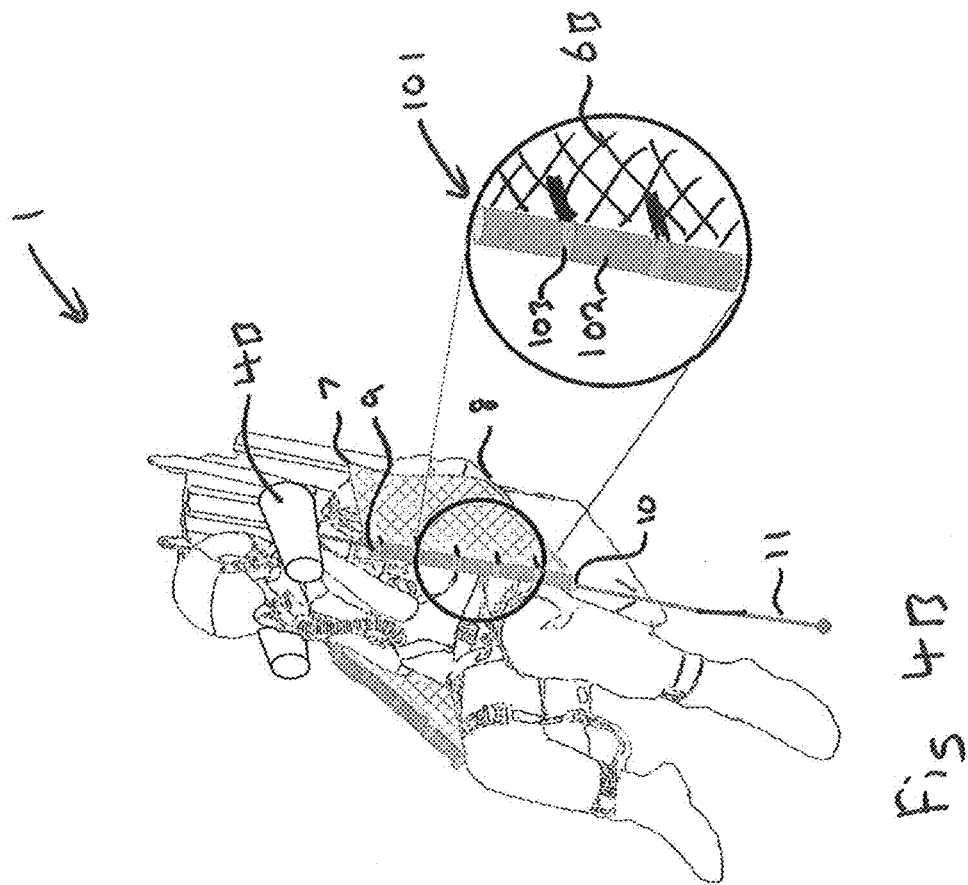
FIGS. 4A and 4B schematically illustrate the ejection seat of FIGS. 1A to 1C with a sleeve.

The ejection seat 1 of FIGS. 1A-1C comprises a seat back 2 and a headrest assembly 3. The headrest assembly 3 is mounted to or forms part of the seat back 2.

The ejection seat 1 further comprises a pair of head support beams 4A, 4B, which are stowable in the headrest assembly 3, and are configured to be deployed such that they project forwardly from the headrest assembly 3, for capturing a seat occupants head 5 therebetween. The arrangement of the head support beams 4A, 4B may be substantially the same as that disclosed in WO2012/013985.

In addition, the ejection seat 1 comprises a pair of arm retention curtains (best shown in FIG. 1C) 6A, 6B. The arm retention curtains 6A, 6B each comprise a first 7, second 8, third 9 and fourth 10 corners.

The first corner 7 is secured adjacent the top of the seat back 2. The second corner 8 is secured adjacent to the bottom of the seat back 2. The third corner 9 is secured at or adjacent the distal end of a respective head support beam 4A, 4B.

The fourth corner 10 is secured to a respective tether 11 which is operable to draw the fourth corner 10 towards the front of the seat base, forwards from the seat back 2.

At least a part of each arm retention curtain 6A, 6B is stowed in a furled (preferably rolled) condition, configured such that deploying the head support beams 4A, 4B and/or drawing the tethers 11 forward from the seat back 2 serves to unfurl the arm retention curtains 6A, 6B.

It should be noted that in FIGS. 1A and 1B, only one of the retention curtains 66 and one of the tethers 11 is visible.

The rolling of the arm retention curtain 6B is illustrated in FIGS. 1A and 1B. It will be noted that the edge 19 of the arm retention curtain 6B between the third corner 9 and the fourth corner 10 is rolled back on itself.

The rolling and unfurling of the arm retention curtain 6A, 6B is schematically illustrated in FIG. 2. Arm retention curtain 6A is illustrated in FIG. 2 in its rolled condition. Arm retention curtain 6B is illustrated in its unfurled position. Of course, in use, both arm retention curtain 6A, 6B will either both be rolled/furled or both be unfurled. FIG. 2 is simply to describe the invention clearly.

With reference to FIG. 2, each arm retention curtain 6A, 6B comprises a first 13 and second 14 opposing surface. The first surface 13 is configured to face the occupant when the curtain 6A, 6B is deployed. When stowed, the arm retention curtain 6A, 6B is rolled along the second surface 14 such that the first surface 13 faces outwardly from the rolled curtain, as shown with arm retention curtain 6A shown in FIG. 2.

In one embodiment, the third corner 9 is journaled with respect to the distal end of the head support beam 4A, 4B. This is to allow the rolled arm retention curtain 6A, 6B to unfurl correctly, whilst not unduly restricting the deployment of the head support beams 4A, 4B.

Likewise, the fourth corner 10 of the arm retention curtain 6A, 6B may be journaled with respect to the end of the tether 11, for the same purpose.

In another embodiment, as illustrated best in FIG. 1B, the third 9 and fourth 10 corners are fixed, without a journal connection, to the respective one of the distal end of the head support beam and the tether. Instead, only the section of the arm retention curtain 6A, 6B between the third 9 and fourth 10 corners of the arm retention curtain CA, 68 are rolled.

In the embodiment shown in FIGS. 1 and 2, the arm retention curtains are rolled, which conveniently reduces friction between the curtain and the occupant's body when being deployed. In some arrangements, as the rolled curtain is unfurled, there may be substantially no relevant movement between the occupant's body and the section of curtain in contact with that point on the occupant's body.

In other embodiments, rather than rolling the curtain, it may be furled. That is to say, substantially uniformly folded back on itself, e.g. in a concertinaed fashion. Such furling substantially reduces the risks of snagging of the curtain during deployment.

The surface of the curtain in contact with the user during deployment may be coated with or comprised of a friction reducing material.

In another embodiment, not shown the tether 11 may be rolled up with the respective arm retention curtain such that drawing the tether 11 away from the seat back 2 causes the arm retention curtain CA, 68 to unfurl. In such an embodiment, the tether is effectively interleaved with the rolled up arm retention curtain, 6A, 6B.

In one embodiment, the ejection seat 1 further comprises a storage compartment in which the rolled up arm retention curtain 6A, 6B may be stowed. The storage compartment may comprise a channel which is closeable by, for example, Velcro® or any closure mechanism which is easily opened by the force of the head support beams 4A, 4B and/or the tether 11 being deployed in use.

A benefit of the ejection seat embodying the present invention is that the arm retention curtains drape over the occupant's shoulders, as compared to under their armpits. Accordingly, substantially all of the occupant's arms are enclosed and retained by the arm retention curtains.

A particular benefit of rolling the arm retention curtains, and unfurling it during deployment, is the reduction in snagging and friction caused during deployment.

The ejection seat 1 further comprises a snubber unit 15, through which the tether 11 passes. The snubber unit 15 serves to constrain movement of the tether 11 through the snubber unit 15 in one direction only. Preferably, the distal end of the tether 11 is secured to the cockpit of an associated aircraft with a weakened joint, which is configured to disconnect at a predetermined force. Accordingly, as is known, as the ejection seat begins to leave the aircraft, the increasing distance between the ejection seat and the point of connection of the tether 11 causes the tether 11 to pass through the snubber, thereby pulling on the fourth corner 10 of the arm restraint curtain 6A, 6B. When the force imposed on the connection to the cockpit floor reaches a predetermined force, the joint will release. The snubber unit 15 serves to prevent the tether 11 from passing back through the snubber unit 15, which would otherwise reduce the tension imposed on the arm restraint curtain 6A, 6B.

Preferably, the arm retention curtain is flexible and/or comprises, at least in part, of mesh.

The head support beams 4A, 4B are preferably inflatable, and the ejection seat 1 may further comprise a gas source (not shown) to inflate said head support beams 4A, 46, as disclosed in WO2012/013985.

Figure 4A:
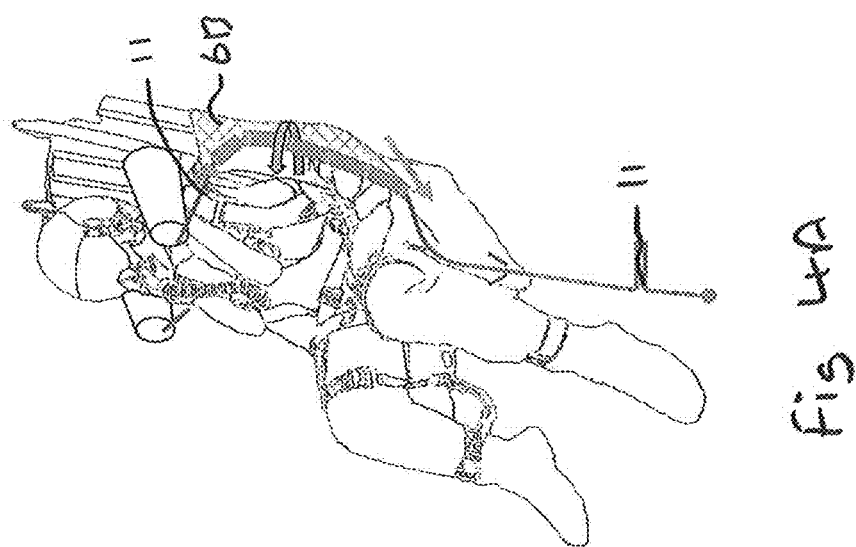

FIGS. 4A and 46 illustrates another embodiment, which generally corresponds to that illustrated in FIGS. 1A-1C, Corresponding features are denoted by like numerals. In the embodiment illustrated in FIGS. 4A and 4B, the edge 19 of the arm retention curtain 6B between the third corner 9 and the fourth corner 10 is provided with or defines a sleeve 101 through which the tether 11 passes. The tether 11 is secured to the distal end of the head beam 46 and then passes through the sleeve 101. Preferably, the sleeve 101 extends substantially along the length of the edge 19, Accordingly, when the tether 11 is pulled, it passes freely through the sleeve 101 until it is pulled taught between the snubber 15 and the distal end of the head beam 4B, holding the arm retention curtain 6B in place.

In one embodiment, the sleeve 101 is formed by folding the material of the arm retention curtain 6B at the edge 19 back on itself and stitching the material together. In another embodiment, the sleeve 101 is a tube(s) to which the edge 19 of the arm retention curtain 6b is secured in at least in one location. Preferably, the sleeve 101 allows for the substantially free movement of the tether therethrough, minimizing the risk of snagging or damaging the sleeve.

In one embodiment, at least a part of the edge 19 between said third 9 and fourth 10 corners of an arm retention curtain 6 includes at least one roller 102. Preferably, a plurality of rollers 102 are provided. In one embodiment, the at least one roller 102 forms or is associated with the sleeve 101. The roller(s) 102 is/are free to rotate about their axis. Accordingly, as the arm retention curtain 6 deploys, the outer surface of roller(s) 102 engage with the user's torso/arms. Consequently, the roller(s) 19 rotates about its axis, reducing the likelihood of the edge 19 getting caught.

In the embodiment shown in FIGS. 4A and 4B, the sleeve 101 comprises a plurality of rollers 102 and a plurality of spacers 103. A spacer 103 is arranged between adjacent rollers 102 and each spacer 103 is secured to the edge 19. The rollers 102 are free to rotate about their longitudinal axes.

FIGS. 3A-3C illustrate an ejection seat 20 according to a second embodiment of the present invention. Like numerals are used to refer to like features.

The ejection seat 20 comprises a seat back 2 and a headrest assembly 3 mounted to or forming part of the seat back 2.

The ejection seat 20 further comprises first 40A and second 40B head support beams, both stowable in the headrest assembly 3 and configured to be deployed through a capturing phase in which they project upwardly from the headrest assembly 3, into a retention phase in which they project forwardly from the headrest assembly 3, for capturing a seat occupant's head 5 therebetween.

The ejection seat 20 further comprises first 6A and second 6B arm retention curtains. The arm retention curtains of the ejection seat 20 may be substantially the same as those of ejection seat 1.

The first head support beam 40A and the first arm retention curtain 6A are provided on a first side of the seat back 2. With reference to FIG. 3A, the first side of the seat back may be referred to as the "left hand side" of the seat. The second head support beam 40B and the second arm retention curtain 6B are provided on a second side of the seat back 2, which may be referred to as the "right hand side" of the seat 2. In use, the occupant is seated between the first and second (left and right) side of the seat back 2. As with the first embodiment, when the head support beams 40A, 40B are deployed, they serve to capture the occupant's head 5 therebetween. The curtains substantially capture the occupant's arms.

A first tether 51A is secured at a first end 52A to the first retention curtain 6A and removably secured, in turn, to the distal ends of the first 40A and second 40B head support beams respectively. The second end 53A of the first tether 51A is arranged to be drawn downwardly from the second side of the seat, as shown in FIG. 3B.

Correspondingly, the second tether 51B is secured at a first end 52B to the second retention curtain 6B and removably secured, in turn, to the distal ends of the second 40B and first 40A head support beams respectively. The second end 53B of the second tether 51B is arranged to be drawn downwardly from the first side of the seat 2, as shown in FIG. 3B/

With reference to FIG. 3B, it will be noted that the first tether 51A travels from the first distal end 52A, along the arm of the first head support beam 40A, before bridging the gap to the end of the second head, support beam 40B, before passing downwardly to the second side of the seat. The second tether 51B has the opposite arrangement.

Before deployment, the tethers 51A, 51B are preferably stowed in channels in the seat, preferably with removable covers.

With reference to FIG. 3A, when the head support beam 40A, 40B are in their capturing phase at least the distal ends of the head support beams 40A, 40B project upwardly from the headrest assembly 3. In so doing, the connection of the first and second tethers 51A, 516 to the head support beams 40A, 406, serve to create an arch which passes over the occupant's head 5 during the capturing phase. The end of the capturing phase is shown in FIG. 3B, into which the head support beams 40A, 40B have passed into a retention phase, in which they project substantially forwardly from the headrest assembly 3. At this point, the two respective tethers 51A, 51B are held by the distal ends of the head support beams 40A, 40B in front of the occupant.

As with the ejection seat 1 illustrated in FIGS. 1A-1C, the second distal end 53A, 53B of the tethers, 51A, 51B are preferably secured to the cockpit of the aircraft in which the ejection seat 20 is mounted. Accordingly, as the ejection seat 20 ejects from the aircraft, the tethers 51A, 51B are caused to be drawn downwardly, preferably through the snubber unit 15. When the tension in the first and second tethers 51A, 516 reaches a predetermined limit, they will be caused to become detached from the distal end of the first and second head support beams 40A, 40B. The continued drawing of the tethers 51A, 51B pulls the arm retention curtain 6A, 6B around the occupant. Because the tethers 51A, 51B are crossed over one another in front of the occupant, they serve to more effectively wrap the occupant with the arm retention curtain 6A, 6B. With reference to FIG. 3C, it will be noted that the corners of the arm retention curtain 6A, 6B almost touch one another.

With reference to FIG. 3C, each of the arm retention curtains 6A, 6B of the ejection seat 20 according to the second embodiment comprises a first 47, second 48 and third 49 corner. The first corner 47 is secured adjacent to the top of the seat back 2, The second corner 45 is secured adjacent the bottom of the seat back 2. The third corner 49 is secured to a first end of the respective tether 51A, 51B.

Each arm retention curtain 6A, 6B preferably further comprises a fourth corner 50. The fourth corner 50 is secured at a point of the other tether. Accordingly, with reference still to FIG. 3C, the third corner 49 of the second arm retention curtain 6B is secured to the second tether 51B, and the fourth corner 50 of the second arm retention curtain 6B is secured at a point of the first tether 51A between its first 52A and second 53A ends. Accordingly, continued drawing of the two tethers 51A, 51B serves to pull inwards the four loose corners of the two arm retention curtains.

In embodiments of the present invention, during the capturing phase, the head support beams preferably project upwardly from the headrest assembly 3. By project upwardly is meant that both beams project at an angle less than 90 degrees with respect to the plane of the seat back. During the capturing phase, the head support beams preferably also project outwardly with respect to one another. By project outwardly is meant that both head beams extend at an angle relative to one another (i.e. with an acute angle therebetween), and/or each beam projects at an angle less than 90 degrees with respect to the horizontal.

In the retention phase, the head support beams preferably project forwardly from the headrest assembly. By project forwardly is meant that the head support beams are preferably horizontal and/or co-planar with a plane which is perpendicular to the seat back, and/or parallel to one another.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An ejection seat comprising:
a seat back with a top and a bottom;
a headrest assembly mounted to or forming part of the seat back;
a pair of head support beams stowable in the headrest assembly, configured to be deployed such that the pair of head support beams project forwardly from within the headrest assembly, for capturing a seat occupant's head between the pair of head support beams;
and a pair of arm retention curtains, at least part of each arm retention curtain is stowed, each having first, second, third and fourth corners, said third and fourth corners separated by an edge of a respective arm retention curtain, wherein:
the first corner is secured adjacent the top of the seat back,
the second corner is secured adjacent the bottom of the seat back,
the third corner is secured adjacent the distal end of a respective head support beam,
a fourth corner is secured to a respective tether which is operable to draw the fourth corner forwards from the seat back,
and said edge including at least one roller configured for rolling allowing substantially free rotation of the rollers about their longitudinal axes;
wherein at least part of each arm retention curtain is configured such that deploying the head support beams and/or drawing the tethers forward from the seat back unfurls the arm retention curtains.

2. The ejection seat of claim 1, wherein each retention curtain comprises first and second opposing surfaces, the first surface configured to face the occupant when the curtain is deployed and wherein, when stowed, the curtain is rolled along the second surface such that the first surface faces outwardly from the rolled curtain.

3. The ejection seat of claim 1, wherein the third corner is journaled to the distal end of the head support beam.

4. The ejection seat of claim 1, wherein the fourth corner is journaled to the tether.

5. The ejection seat of claim 1, wherein the tether is rolled up with a respective curtain such that drawing the tether away from the seat back causes the arm retention curtain to unfurl.

6. The ejection seat of claim 1, further comprises a storage compartment in which the furled/rolled curtain may be stowed.

7. The ejection seat of claim 1, wherein at least a part of the edge between said third and fourth corners of an arm retention curtain includes or comprises at least one sleeve.

8. The ejection seat of claim 7, wherein said tether is secured adjacent the distal end of a respective head support beam and is translatably received through said sleeve.

9. The ejection seat of claim 7, wherein the sleeve comprises a plurality of rollers and a plurality of spacers, wherein a spacer is arranged between adjacent rollers and each spacer is secured to the edge between said third and fourth corners of said arm retention curtain.

10. The ejection seat of claim 1, wherein each tether passes through a snubber to constrain movement of the tether through the snubber in one direction.

11. The ejection seat of claim 1, wherein, in use, the distal end of each tether is secured to the cockpit of an associated aircraft with a weakened joint, configured to disconnect at a predetermined force.

12. The ejection seat of claim 1, wherein the arm retention curtain is flexible and/or is comprised, at least in part, of mesh.

13. The ejection seat of claim 1, wherein the head support beams are inflatable.

14. The ejection seat of claim 13, further comprising a gas source to inflate said head support beams.

15. The ejection seat of claim 1, configured such that, in use, the arm restraint curtains extend from in the vicinity of the occupant's waist to the vicinity of the occupant's neck, thereby capturing the occupant's arms between the respective curtains.

16. An ejection seat comprising:
a seat back;
a headrest assembly mounted to or forming part of the seat back;
first and second head support beams, both stowable in the headrest assembly;
configured to be deployed through a capturing phase in which the first and second head support beams project upwardly from the headrest assembly, into a retention phase in which said first and second support beams project forwardly from the headrest assembly, for capturing a seat occupant's head between the first and second head support beams;
and first and second arm retention curtains;
wherein the first head support beam and the first arm retention curtain are provided on a first side of the seat back, and the second head support beam and the second arm retention curtain are provided on a second side of the seat back, wherein the occupant is seated, in use, between the first and second sides of the seat back,
a first tether secured at a first end to the first retention curtain and removably secured, in turn, to the distal ends of the first and second head support beams respectively, the second end of the first tether arranged to be drawn downwardly from the second side of the seat, and
a second tether secured at a first end to the second retention curtain and removably secured, in turn, to the distal ends of the second and first head support beams respectively, the second end of the second tether arranged to be drawn downwardly from the first side of the seat,
wherein the first and second tethers are bridged between the distal ends of the first and second head support beams and cross over one another,
wherein, in use, after deployment of the head support beams, the second ends of each of the first and second tethers are configured to be drawn downwards such that the first and second tethers become detached from the first and second head support beams, and further drawing of the tethers causes the first and second curtains to wrap at least partially around the occupant.

17. The ejection seat of claim 16, wherein the first and second tethers are removably secured to the distal ends of the first and second head support beams to create a loop which passes over the occupant's head during the capturing phase.

18. The ejection seat of claim 16, wherein each retention curtain comprises a first, second and a third corner, wherein:
the first corner is secured adjacent the top of the seat back, the second corner is secured adjacent the bottom of the seat back, and the third corner is secured to a first end of the respective tether.

19. The ejection seat of claim 18, wherein each retention curtain further comprise a fourth corner, wherein the fourth corner of the first retention curtain is secured at a point of the second tether between the first and second ends, and the fourth corner of the second retention curtain is secured at a point of the first tether between the first and second ends.

* * * * *